3,261,833
2,4-DIAMINO-6-AMINOALKOXY PYRIMIDINES
Blaine M. Sutton, Philadelphia, and Joseph Weinstock, Phoenixville, Pa., assignors to Smith Kline & French Laboratories, Philadelphia, Pa., a corporation of Pennsylvania
No Drawing. Filed Oct. 20, 1964, Ser. No. 405,286
8 Claims. (Cl. 260—247.5)

This invention relates to novel chemical compounds and more specifically to 2,4-diamino-6-substituted pyrimidines. These compounds have useful pharmacodynamic activity as manifested by their effect upon the central nervous system. More specifically the novel substituted pyrimidines of this invention have hypotensive, mild tranquilizing and sedative activity.

The compounds of this invention may be represented by the following general structural formula:

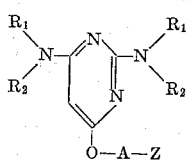

in which:

$R_1$ and $R_2$ each represent hydrogen or lower alkyl, preferably hydrogen or methyl;
A represents a bivalent alkylene chain, branched or straight, of from 2 to 4 carbon atoms; and
Z represents amino, N-loweralkylamino, N,N-diloweralkylamino, N-pyrrolidino, N-piperidino, N-morpholino or N-(N'-methyl)-piperazino, preferably N,N-diloweralkylamino.

The term lower alkyl where used herein indicates a group of from 1 to 4 carbon atoms.

Preferred compounds of this invention are represented by the following formula:

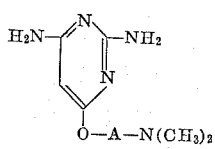

in which A represents —CH$_2$CH$_2$— or

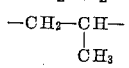

An especially advantageous compound of this invention is 2,4-diamino-6-methylaminoethoxypyrimidine.

This invention also includes salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl or chloroform, with the desired salt separating directly. Exemplary of such organic salts are those with maleic, hexamic, fumaric, benzoic, ascorbic, pamoic, succinic, bismethylenesalicyclic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, hydroiodic, sulfuric, sulfamic, phosphoric and nitric acids. Of course these salts may also be prepared by the classical method of double decomposition of appropriate salts which is well known to the art.

The preparation of the compounds of this invention where Z is a tertiary amino group may be illustrated by the following reaction scheme:

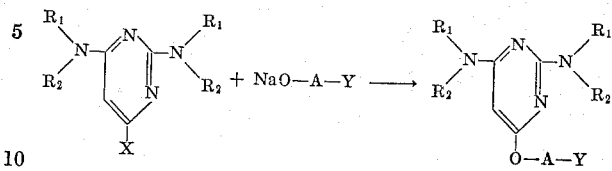

in which:

$R_1$ and $R_2$ are as defined for Formula I above;
X represents halogen, preferably chlorine; and
Y represents N,N-diloweralkylamino, N-pyrrolidino, N-piperidino, N-morpholino or N-(N'-methyl)piperazino.

Thus, a 2,4-diamino-6-halopyrimidine is condensed with the sodium salt of an appropriate aminoalkanol. The pyrimidine starting material is readily available and preferably is a 6-chloropyrimidine. Other alkali metal salts, such as potassium, of the aminoalkanol may be used as well.

The condensation is advantageously run in an anhydrous organic hydrocarbon solvent such as benzene, toluene or xylene, at reflux temperature for a period of from 4 to 24 hours or in an excess of the aminoalkanol. Removal of the inorganic salts, followed by usual workup procedures gives the products in good yields.

To prepare the compounds of Formula I wherein Z is primary amino or N-loweralkylamino, the same general procedure as described above is employed except that an N-protected aminoalkanol is condensed with the 6-halopyrimidine. For example, condensation with an N-hydroxyalkylenephthalimide or an N-loweracyl-N-loweralkylaminoalkanol yields after appropriate removal of the N-protective groups, the primary amino and N-loweralkylamino products, respectively. Preferably the N-lower acyl group is acetyl.

The following examples are illustrative of the preparative methods for the compounds of this invention and are not to be construed as limiting the scope of the invention.

*Example 1*

A mixture of 27 g. of dimethylaminoethanol, 5.8 g. of sodium and 500 ml. of dry xylene is refluxed for one hour. The mixture is cooled and 29 g. of 2,4-diamino-6-chloropyrimidine is added. After refluxing for four hours, the hot reaction mixture is filtered and the filtrate is cooled to give the solid product, 2,4-diamino-6-dimethylaminoethoxypyrimidine which after recrystallization from isopropanol melts at 157–159° C. Treatment of the free base with ethereal hydrogen chloride yields the dihydrochloride salt.

*Example 2*

To a solution of 1.44 g. of sodium and 9.25 g. of dimethylaminopropanol in 125 ml. of dry xylene is added 7.2 g. of 2,4-diamino-6-chloropyrimidine and the mixture is refluxed for 16 hours. The cooled filtrate from the reaction mixture gives an oil which upon trituration with ether yields 2,4-diamino-6-dimethylaminopropoxypyrimidine, M.P. 95–97° C.

*Example 3*

A mixture of 2.87 g. of sodium, 17.5 g. of 2-dimethylaminopropanol and 250 ml. of dry xylene is refluxed for three hours. The cooled solution is treated with 14.45 g. of 2,4-diamino-6-chloropyrimidine and then refluxed for 22 hours. The hot reaction mixture is filtered and the filtrate cooled to give the product, 2,4-diamino-6-(2-dimethylaminopropoxy)pyrimidine which after recrystallization from ether melts at 154.5–156.5° C.

Example 4

To a solution of 2.88 g. of sodium and 16.5 g. of dimethylaminopropanol-2 in 250 ml. of xylene is added 14.45 g. of 2,4-diamino-6-chloropyrimidine and the mixture is refluxed for 22 hours. The reaction mixture is filtered and the filtrate is evaporated to dryness. The residue is recrystallized from toluene to give 2,4-diamino-6-(β-dimethylaminoisopropoxy)pyrimidine, M.P. 104–105.5° C.

Example 5

A mixture of 1.15 g. of sodium dissolved in 7.75 g. of N-hydroxyethylpiperidine and 125 ml. of dry xylene is refluxed for twelve hours, cooled and 5.8 g. of 2,4-diamino-6-chloropyrimidine is added. The resulting solution is refluxed for 24 hours, filtered and the filtrate is evaporated to dryness. The residue is taken up in boiling ether and cooled to give 2,4-diamino-6-(2-N-piperidinylethoxy)-pyrimidine which after recrystallization from isopropanol melts at 151–153° C.

Similarly by employing an equivalent amount of N-hydroxyethylpyrrolidine or N-hydroxyethylmorpholine in the above reaction sequence there is obtained 2,4-diamino-6-(2-N-pyrrolidinylethoxy)-pyrimidine and 2,4-diamino-6-(2-N-morpholinylethoxy)-pyrimidine, respectively.

Example 6

To a solution of 2.88 g. of sodium dissolved in 17.6 g. of 2-diethylaminoethanol and 500 ml. of dry xylene under nitrogen is added 14.45 g. of 2,4-diamino-6-chloropyrimidine. The mixture is refluxed for 12 hours, filtered hot and the filtrate concentrated and cooled to yield 2,4-diamino-6-diethylaminoethoxypyrimidine, M.P. 76.5–78° C.

Example 7

A solution of 1.63 g. of sodium dissolved in 100 ml. of water-free 2-dimethylaminoethanol is cooled and then 10 g. of 2-amino-4-methylamino-6-chloropyrimidine is added. The mixture is refluxed for four hours, filtered hot and the filtrate evaporated to dryness. The residue is recrystallized from ethyl acetate to yield 2-amino-4-methylamino-6-dimethyl-aminoethoxypyrimidine, M.P. 111.5–113.5° C.

Example 8

A mixture of 1.47 g. of sodium dissolved in 100 ml. of water-free 2-dimethylaminoethanol and 10 g. of 2-amino-4-dimethylamino-6-chloropyrimidine is refluxed for five hours. The cooled reaction mixture is filtered and the filtrate evaporated to dryness. The residue is purified by treatment with boiling hexane and then ether to give 2-amino-4-dimethylamino-6-dimethylaminoethoxypyrimidine, M.P. 71.5–73° C.

Example 9

A mixture of 5.0 g. of 2-methylamino-4,6-dichloropyrimidine and an excess of alcoholic ammonia is heated at 160° C. for five hours. Removal of the solvent and workup of the residue yields 2-methylamino-4-amino-6-chloropyrimidine. This pyrimidine (5.0 g.) is added to a solution of 0.8 g. of sodium in 50 ml. of water-free 2-dimethylaminoethanol. The mixture is heated at reflux for six hours, filtered and the filtrate evaporated to yield 2-methylamino-4-amino-6-dimethylaminoethoxypyrimidine.

Example 10

A mixture of 5.0 g. of 2-dimethylamino-4,6-dichloropyrimidine and an excess of alcoholic ammonia is heated at 160° C. for six hours. Workup of the reaction mixture yields 2-dimethylamino-4-amino-6-chloropyrimidine. This pyrimidine (5.0 g.) is added to a solution of 0.75 g. of sodium dissolved in 50 ml. of water-free 2-dimethylaminoethanol. The mixture is refluxed for six hours, filtered and the filtrate evaporated to give 2-dimethylamino-4-amino-6-dimethylaminoethoxypyrimidine.

Example 11

A mixture of 7.7 g. of N-hydroxyethylphthalimide, 0.7 g. of sodium and 150 ml. of dry xylene is refluxed for one hour, cooled and 2.9 g. of 2,4-diamino-6-chloropyrimidine is added. After refluxing for four hours, the reaction mixture is filtered and the filtrate cooled to give 2,4-diamino-6-(N-phthalimidoethoxy)-pyrimidine. The phthalimido pyrimidine is heated in a mixture of hydrazine and methanol on the steam bath to yield 2,4-diamino-6-aminoethoxypyrimidine.

Example 12

A mixture of 5.9 g. of N-acetyl-N-methylaminoethanol, 0.9 g. of sodium and 125 ml. of dry xylene is refluxed for one hour. The reaction mixture is treated with 4.3 g. of 2,4-diamino-6-chloropyrimidine and then refluxed for four hours. The mixture is filtered and the filtrate cooled to give 2,4-diamino-6-(N-acetyl-N-methylaminoethoxy)-pyrimidine which is hydrolyzed with alcoholic alkali to yield the product, 2,4-diamino-6-methylaminoethoxypyrimidine.

Example 13

A mixture of 0.7 g. of sodium dissolved in 5.8 g. of N-hydroxyethyl-N'-methylpiperazine and 150 ml. of dry xylene is refluxed for two hours, cooled and 2.9 g. of 2,4-diamino-6-chloropyrimidine is added. The resulting mixture is refluxed for 16 hours, filtered and the filtrate is evaporated to dryness. The residue is purified by recrystallization to give 2,4-diamino-6-(N'-methyl-N-piperazinylethoxy)-pyrimidine.

Example 14

A mixture of 2.3 g. of sodium, 17.6 g. of 2-dimethylaminobutanol and 250 ml. of dry xylene is refluxed for three hours. The cooled solution is treated with 10.8 g. of 2,4-diamino-6-chloropyrimidine and then refluxed for 24 hours. The reaction mixture is filtered and the filtrate cooled to give the product, 2,4-diamino-6-(2-dimethylaminobutoxy)-pyrimidine.

What is claimed is:

1. A chemical compound selected from the group consisting of a free base and its nontoxic pharmaceutically acceptable acid addition salts, said free base having the formula:

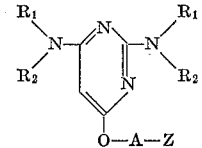

wherein:

$R_1$ and $R_2$ are each members selected from the group consisting of hydrogen and lower alkyl of from 1 to 4 carbon atoms;

A is an alkylene chain of from 2 to 4 carbon atoms; and

Z is a member selected from the group consisting of amino, N-loweralkylamino, N,N-diloweralkylamino, N-pyrrolidino, N-morpholino, N-piperidino and N-(N'-methyl)-piperazino, said lower alkyl groups being from 1 to 4 carbon atoms.

2. A chemical compound of the formula:

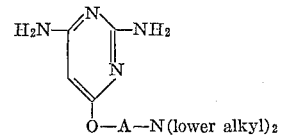

wherein A is an alkylene chain of from 2 to 4 carbon atoms; and lower alkyl is from 1 to 4 carbon atoms.

3. A chemical compound of the formula:
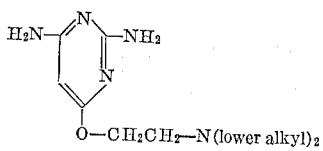
wherein lower alkyl is from 1 to 4 carbon atoms.
4. A chemical compound of the formula:
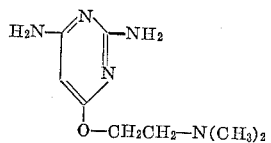
5. A chemical compound of the formula:
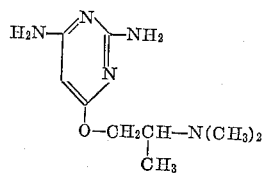
6. A chemical compound of the formula:
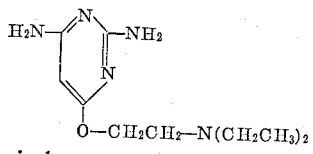
7. A chemical compound of the formula:
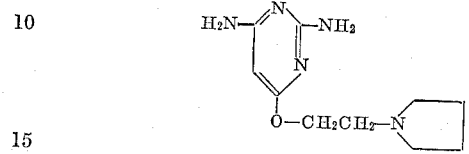
8. A chemical compound of the formula:
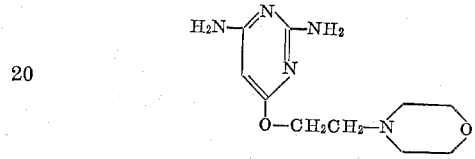
No references cited.
HENRY R. JILES, *Acting Primary Examiner.*
R. GALLAGHER, *Assistant Examiner.*